United States Patent [19]
Söderberg

[11] Patent Number: 5,633,921
[45] Date of Patent: May 27, 1997

[54] PROVIDING SPECIAL SERVICES TO A CALLER CONFIGURED AS A VIRTUAL CALLED PARTY

[75] Inventor: Lennart Söderberg, Enskede, Sweden

[73] Assignee: Telefonaktiebolaget LM Ericsson, Stockholm, Sweden

[21] Appl. No.: 615,581

[22] Filed: Mar. 12, 1996

Related U.S. Application Data

[63] Continuation of Ser. No. 247,316, May 23, 1994, abandoned.

[51] Int. Cl.⁶ ............................................ H04M 7/10
[52] U.S. Cl. .................................. 379/207; 379/220
[58] Field of Search .............................. 379/201, 207, 379/211, 112, 115

[56] References Cited

U.S. PATENT DOCUMENTS

| | | | |
|---|---|---|---|
| 3,714,378 | 1/1973 | Kimura et al. | 379/201 |
| 4,028,498 | 6/1977 | Mehaffey et al. | 379/211 |
| 4,757,526 | 7/1988 | Foster et al. | 379/212 |
| 4,759,056 | 7/1988 | Akiyama | 379/197 |
| 4,802,199 | 1/1989 | Lange et al. | 379/221 |
| 4,879,743 | 11/1989 | Burke et al. | 379/211 |
| 4,899,373 | 2/1990 | Lee et al. | 379/207 |
| 4,982,421 | 1/1991 | Kirsch et al. | 379/216 |
| 5,095,504 | 3/1992 | Nishikawa et al. | 379/201 |
| 5,181,238 | 1/1993 | Medamana | 379/95 |
| 5,197,092 | 3/1993 | Bamburak | 379/59 |
| 5,214,691 | 5/1993 | Cotton et al. | 379/171 |
| 5,222,125 | 6/1993 | Creswell | 379/67 |
| 5,241,588 | 8/1993 | Babson, III | 379/201 |
| 5,353,331 | 10/1994 | Emery | 379/58 |
| 5,487,110 | 1/1996 | Bray et al. | 379/220 |

FOREIGN PATENT DOCUMENTS

| | | |
|---|---|---|
| 4-252648A | 4/1994 | Japan. |
| 6-98019A | 4/1994 | Japan. |
| 2271912 | 4/1994 | United Kingdom. |

*Primary Examiner*—Krista M. Zele
*Assistant Examiner*—Thomas F. Presson
*Attorney, Agent, or Firm*—Jenkens & Gilchrist, P.C.

[57] ABSTRACT

Special subscriber services are implemented by providing operator functionality and service logic within a transit exchange to equip it as a serving node. A subscriber connected to an end office coupled to the transmit exchange invokes the special services functionality by signalling such as by means of a long switch hook flash. Once invoked particular special services may be selected by DTMF or voice prompt signalling.

10 Claims, 1 Drawing Sheet

5,633,921

PROVIDING SPECIAL SERVICES TO A CALLER CONFIGURED AS A VIRTUAL CALLED PARTY

This application is a continuation of a application Ser. No. 08/247,316 filed May 23, 1994 which was abandoned upon the filing hereof.

FIELD OF THE INVENTION

The invention relates to telecommunications systems and, more particularly, to providing special subscriber services in a telecommunication network.

BACKGROUND OF THE INVENTION

History of Related Art

In telecommunications systems, special subscriber features such as call waiting, call forwarding, abbreviated dialing, etc., are becoming increasingly important to both individual subscribers (for reasons of added convenience) as well as to telecommunications providers (because such features are sources of additional revenue). Such features are generally provided by special programming in the software of the central office exchange serving a particular subscriber. That is, the local exchange switch software is separately programmed to provide special service features to the subscribers connected thereto. Often both the hardware and the software of an exchange must be upgraded in order to enable the provision of special subscriber functionality. Calls between two parties connected to different exchanges are completed via a so-called transit or tandem exchange which forms part of the network interconnecting individual central office switches to one another. In those calls, the transit exchange is transparent to the two parties to the call and simply provides a voice path between the two end offices. Any special service features invoked by either party are provided by the end office to which that subscriber is connected, independent of the network connection between the two parties.

In most telecommunication systems providing plain old telephone service (POTS), the communications link between a calling party (A-party) and the called party (B-party), is under the control of the A-party. That is, the communication link remains in place until the A-party's telephone instrument is placed "on-hook" and the system breaks the communication links in the end offices of both parties and in any transit exchange(s) used to link the end offices together. Placing the called party's (B-party) telephone instrument on-hook has little effect until after a period on the order of several minutes (e.g., four minutes) after which a timer expires triggering the disconnection of the circuits between the calling and called parties. In certain other types of telecommunication services, such as integrated services digital network (ISDN), B-party disconnect is employed but the mechanisms for implementing it are considerably different from those of conventional POTS networks.

Providing special subscriber services within conventional telecommunication exchanges requires an extensive upgrading of the software of each and every individual exchange which is to furnish such special services to its customers. Such upgrading of exchanges is often extremely expensive and virtually prohibitive from a cost effectiveness standpoint with respect to the additional revenue provided by the added subscriber services. This is particularly prevalent in small towns or rural areas where the demand for special subscriber services is relatively low and where existing exchanges have been place for a considerable period of time and continue to adequately serve the basic telecommunications needs of the subscribers.

In exchanges which contain the enhanced software necessary to provide special subscriber services, the mechanism by which such subscriber services are triggered in the exchange is that of a subscriber instrument switch hook "flash", i.e., a brief depression of the instrument switch hook to signal the system that special services are required. For example, a short depression of the switch hook by one party is used to place the other party on hold and speak with a third party in response to a call waiting tone. A second switch hook flash restores the connection with the other party and disconnects the third party. Such hook flashes are terminated solely in the end office to which the subscriber sending the hook flash is connected. That is, the signalling function provided by the switch hook flash is only detected in the local central office to which the sending subscriber is connected and does not reach any transit exchange through which that office may be connected to another local central office. It is only when the time period the switch hook is depressed exceeds a first extended period of time that the local switch interprets the flash as a calling party disconnect signal (rather that a special services invocation signal) to then interrupt the connection. A switch hook flash of a second considerably longer period of time is necessary in order to signal a called party disconnect. In either case, an actual switch hook flash is transparent to the transit exchange and it is only in response to disconnect signals received from the end offices that causes it to disconnect its interoffice network connection.

It would be highly desirable to have a means by which special subscriber services could be rendered at the transit exchange level so that one transit exchange could serve many different local exchanges and thereby minimize the cost of a service provider to offer special services to its subscribers. That is, if special services were provided at the tandem or transit exchange level, as opposed to the local end office level, the hardware/software modifications necessary in the transit exchange would be more cost effective than the upgrading of each and every separate end office as is currently the case.

Comparatively recently, the concept of a universal telephone number (UTN) has been promoted in which a subscriber would have a single telephone number which would identify that subscriber to a telecommunications network regardless of the individual network terminal at which that subscriber is located. The network would maintain a data base so that once the subscriber having the UTN notifies the network of the current access terminal at which the subscriber is located, by calling the network and entering that information, the network can locate the subscriber in the event any calls are placed to the UTN. This concept greatly enhances the mobility of a subscriber and in addition, allows that subscriber to be provided with special subscriber services associated with his UTN. The subscriber can then be provided with the desired complement of special services regardless of where that subscriber originates or receives a call.

UTN subscribers reasonably expect to be provided with their special services regardless of where they are physically located. This expectation is difficult to meet in the event that special subscriber services can be provided only by virtue of special software and programming contained within the end office to which the subscriber is connected. One barrier against providing special services within a transit exchange is that in conventional POTS telecommunication networks, transit exchanges are essentially transparent to the telecommunications link. That is, it is virtually impossible to use in-band DTMF signalling to control special subscriber services functionality since that would prevent the use of such signalling to control other modem telephone applications such as banking services.

Thus, it would be highly desirable to be able to provide some means for providing within the transit exchange a capability of implementing special service features. This would require means for signalling to the transit exchange that a party desires to invoke and control special subscriber service features.

SUMMARY OF THE INVENTION

The present invention provides special service features within a telecommunication network including a first end office exchange to which a calling party can be connected, a second end office exchange to which a called party can be connected and a transit exchange connecting the two end office exchanges. The transit exchange is provided with a service switch function and service logic building blocks for providing special subscriber service features. A call is completed from a calling party connected to the first end office to a called party connected to the second office through the service switch function of the transit exchange. A signal from the called party is recognized in the transit exchange as being indicative of a desire to invoke special subscriber services. In response to the called party signal recognition, the transit exchange is conditioned for the further reception of signals from the called party indicative of which subscriber services are desired to be invoked. Service logic within the service logic building blocks is connected to the completed call circuit to which the called subscriber is connected and the special subscriber services invoked by the called party are provided by the service logic.

The present invention further provides special subscriber service features to universal telephone number (UTN) subscribers within a telephone communication network. Each subscriber has pre-selected particular special service features to which it may desire access. The telecommunication network includes a pair of local end office exchanges to which one or more UTN subscribers may be connected as either called or calling parties. A transit exchange couples the end offices to one another. A service switch function and service logic building blocks for providing special subscriber service features are provided within the transit exchange. At least one UTN subscriber is registered within the transit exchange as being present at a particular access terminal of one of said pair of local end office exchanges. A call is completed from a calling party connected to one of the end offices to a called party connected to the other of the end offices through the service switch function of the transit exchange. An event signal is received at the transit exchange from a UTN subscriber connected into the network as a called party. The transit exchange recognizes that the received event signal is indicative of the desire of the UTN subscriber to invoke special services to which it has subscribed. The reception of additional signals from the UTN subscriber selecting which particular special service it desires to invoke is conditioned within the service logic building blocks of the transit exchange and user features within the service logic building blocks of the transit exchange provide each invoked special subscriber service feature to the UTN subscriber.

The registration of at least one UTN subscriber further includes receiving at the transit exchange, from the UTN subscriber connected to an access terminal in an end office exchange, the dialed digits of the UTN subscriber's number and receiving at the transit exchange an on-hook signal from the UTN subscriber after the dialed digits of the UTN number are received. A call is thereafter completed from the transit exchange to the UTN subscriber at the access terminal from which the dialed digits of the UTN subscriber's number were received to connect the UTN subscriber to the network as a "virtual called party" within the network and enable the UTN subscriber to place a call to a called party and then invoke special services by signalling the transit exchange with a long switch hook flash.

BRIEF DESCRIPTION OF THE DRAWINGS

For a complete understanding of the present invention and for further objects and advantages thereof, reference can now be had to the following description, taken into conjunction with accompanying drawings in which.

DETAILED DESCRIPTION

As discussed above, providing special telecommunication services to subscribers by the upgrading of each local exchange is expensive and often not cost effective. It is considerably more efficient if special subscriber services are provided from a central location, like a transit exchange, which can serve a plurality of local exchanges and provide the special subscriber services to multiple parties.

Providing special subscriber services associated with UTN numbers also presents a unique problem. A principal feature of having UTN service is the ability to receive telecommunication service regardless of the terminal (or end office to which that terminal is connected) where the subscriber is located and special services cannot generally be provided on a local end office basis without modification of that end office. Thus, providing special service features at a transit exchange level has an additional advantage in the case of providing such services to UTN subscribers.

As discussed above, switch hook flashes are generally used in advanced local end office exchanges to trigger access to special subscriber services. Therefore, in end offices which are equipped to provide such features, the reception of an "on-hook" condition is interpreted to be a signal to implement special services features. For example, a hook flash having a duration in the range of 50–500 milliseconds is terminated in the local central office. It is only in the event that the on-hook condition lasts beyond a preselected time period that it is communicated outside of the local exchange onto the network. For example, when the on-hook condition lasts for more than 500 milliseconds or so it is deemed to be an "on-hook condition" and a timer is started in the transit exchange which times out after 3 or 4 minutes to interrupt the call as a "called party disconnect" condition.

Figure 1:
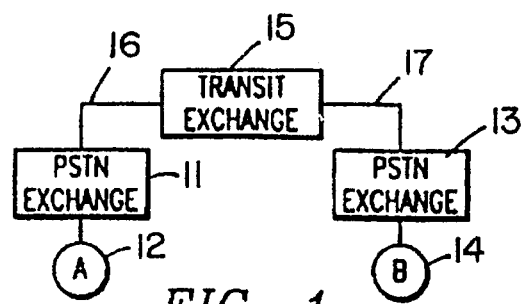
FIG. 1 is a block diagram illustrating a telecommunication network within which the system of the present invention may be implemented.

Referring now to FIG. 1, there is shown a first local exchange 11 to which a calling or A-party 12 is connected and a second or terminating exchange 13 to which a called or B-party 14 is connected. The two offices 11 and 13 are connected by a transit exchange 15 which is coupled by the communication link 16 to the exchange 11 and the communication link 17 to the exchange 13. FIG. 1 illustrates conventional "calling party disconnect" mode which requires a called party to be on-hook for a substantial period of time in order to effect a disconnect of the linkage. Once a communication path is set up between the A-party 12 and the B-party 14 an "on-hook" condition at the instrument of the A-party will trigger a disconnect of the entire linkage. An "on-hook" condition which occurs at the instrument of the B-party 14 will be initially recognized in only the local exchange 13 and viewed as a signal to invoke special services if that local exchange is capable of providing such. It is only when the "on-hook" condition by the B-party lasts more than a selected period of time that its occurrence is communicated out onto the link 17 to the transit exchange 15 where a timer is started to disconnect the call after a selected period of time.

As can be seen in FIG. 1, special subscriber services can be provided to the A-party 12 in the event such services are implemented in its own local end office 11. Similarly, special subscriber services can be provided to the B-party 14 in the event the local exchange 13 to which it is connected is equipped to provide such services. When a UTN subscriber which is normally resident outside the network shown in FIG. 1, and which has subscribed to certain special subscriber services, seeks to implement those services as either the A-party 12 or the B-party 14, those services cannot be rendered if the special services are only available by virtue of programming in the local exchanges 12 or 13. The system of the present invention provides means within the transit exchange 15 to render special subscriber service features to a subscribing party connected within the network regardless of whether that subscriber is connected as the A-party 12 or the B-party 14.

In general, the transit exchange 15 is enhanced to become a UTN serving node by providing operator functionality within it as well as means for analyzing and responding to UTN numbers to provide special subscriber services features under control of either DTMF signals or voice prompt mechanisms. Such functionality may be provided in different ways including the addition of a special services subsystem (SES) within an AXE-10 stored program controlled (SPC) telecommunication switching exchange of the type manufactured by Telefonaktiebolaget LM Ericsson, the assignee of the present invention. Such SES includes numerous modules which provide all of the necessary functionality to enhance an SPC exchange to incorporate special subscriber services features.

With the transit exchange 15 having its functionality enhanced to that of a UTN server node as described above, a B-subscriber 14 may then interact with the transit exchange by means of an extended switch hook flash and invoke special subscriber services. That is, assuming the transit exchange 15 is constructed in accordance with the teachings of the present invention and a call is made from the A-subscriber 12 to the B-subscriber 14 in FIG. 1 through the end offices 11 and 13, a UTN user connected to the B-subscriber access line 14 can invoke special services by first executing a long switch hook flash of sufficient length to be passed out of the end office 13 to the transit exchange 15. As discussed above, a hook flash having an on-hook period of approximately 50–500 milliseconds, for example, is simply communicated to the end office 13 and normally used for invoking special services provided by that office. However, a flash of greater than about 500 milliseconds, for example, 500–1500 milliseconds (long hook flash) would be communicated out of the end office 13 and detected at the transit exchange 14. The detection of such a signal at the transit exchange is interpreted as the desire of a UTN user connected to B-party terminal 14 to invoke special services.

The signal would condition the necessary circuitry for thereafter receiving subscriber feature control information from the UTN user at the B-terminal 14. For example, DTMF digits could be used to select the special services desired or a voice prompt requesting the entry of certain DTMF digits could also be used as a menu. Thereafter, the special subscriber services subscribed to and invoked by the UTN user located at the B-terminal 14 would be provided via the transit exchange.

When a UTN user is the called party in a network having calling party disconnect, the present invention is implemented to render special services in response to the receipt of a long switch hook flash at a "event detection point" provided in the transit exchange 15. The present system provides, moreover, a "mid-call trigger" mechanism by which a called party can invoke special services rendered by a transit exchange.

Figure 2:
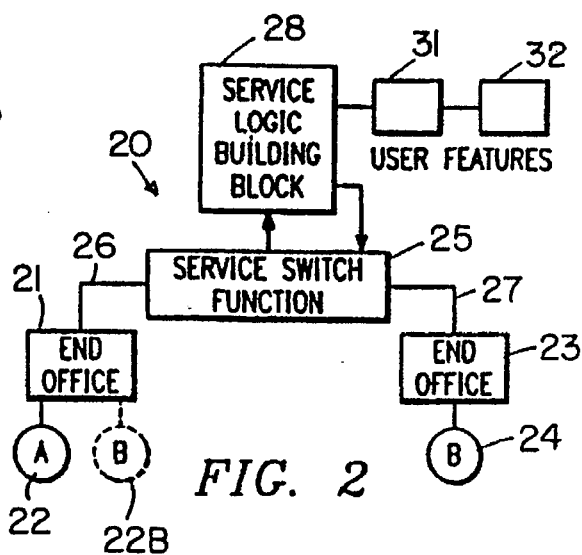
FIG. 2 is a block diagram of a system incorporating the present invention.

The system of the present invention also includes a technique by which a transit exchange provides special subscriber services to both a UTN A-party and/or a UTN B-party within a calling party release environment. Referring to FIG. 2, there is shown a first end office 21 to which a calling A-party 22 is connected via a second end office 23 to a called B-party 24. The end offices 21 and 23 are connected to one another by a transit exchange 20 providing a service switch function 25 connected to the end office 21 by a trunk 26 and to the end office 23 by a trunk 27. The service switching function portion 25 of the transit exchange 20 is connected to service logic building blocks (SLBBs) 28 which provid a plurality of user features 31 and 32. Assuming that the subscriber comprising the calling A-party 22 is a UTN subscriber, the service switching function 25 receives, illustratively, the digits of its UTN number dialed by the A-subscriber 22 followed by a personal identification (PIN) number. Upon completion of the dialing of its own UTN number and PIN code, the UTN subscriber connected to the A-terminal 22 simply hangs up. Thereafter, the service switching function 25 completes a call back to the access terminal to which the A-party 22 was connected in the end office 21 and when that party answers it effectively becomes a called or "virtual" B-party 22B as far as the service switch function 25 is concerned. Next, the UTN subscriber now connected to the network as virtual "called" party 22B enters the digits of the real called B-party 24. Upon completion of the connection between the party 22B and the party 24, through the service switch function 25, both parties 22B and 24 are actively connected to the transit exchange 20 as "called" parties. Thereafter, either party may invoke special subscriber services from the service switch function 25 in the transit exchange 20, by means such as a long switch hook flash, just as in the case of the called B-party 14 in the example described above in connection with FIG. 1.

The service logic building blocks (SLBBs) 28 within the transit exchange 20 are of the general types specified by CCITT specifications. However, the particular SLBBs 28 involved in the present invention would include a programmable timer capable of sensing a long switch hook flash indicative of the fact that a subscriber desires to invoke special service features provided by the transit exchange. In addition, the SLBBs 28 would also include the requisite number of standard modules necessary to provide the particular special service features available for selection by the parties. The service logic 25 consists of three basic parts, an originating portion providing the connection to a calling party, a terminating portion for providing a connection to a called party, and service logic for providing the special service feature logic to a subscriber.

Figure 3:
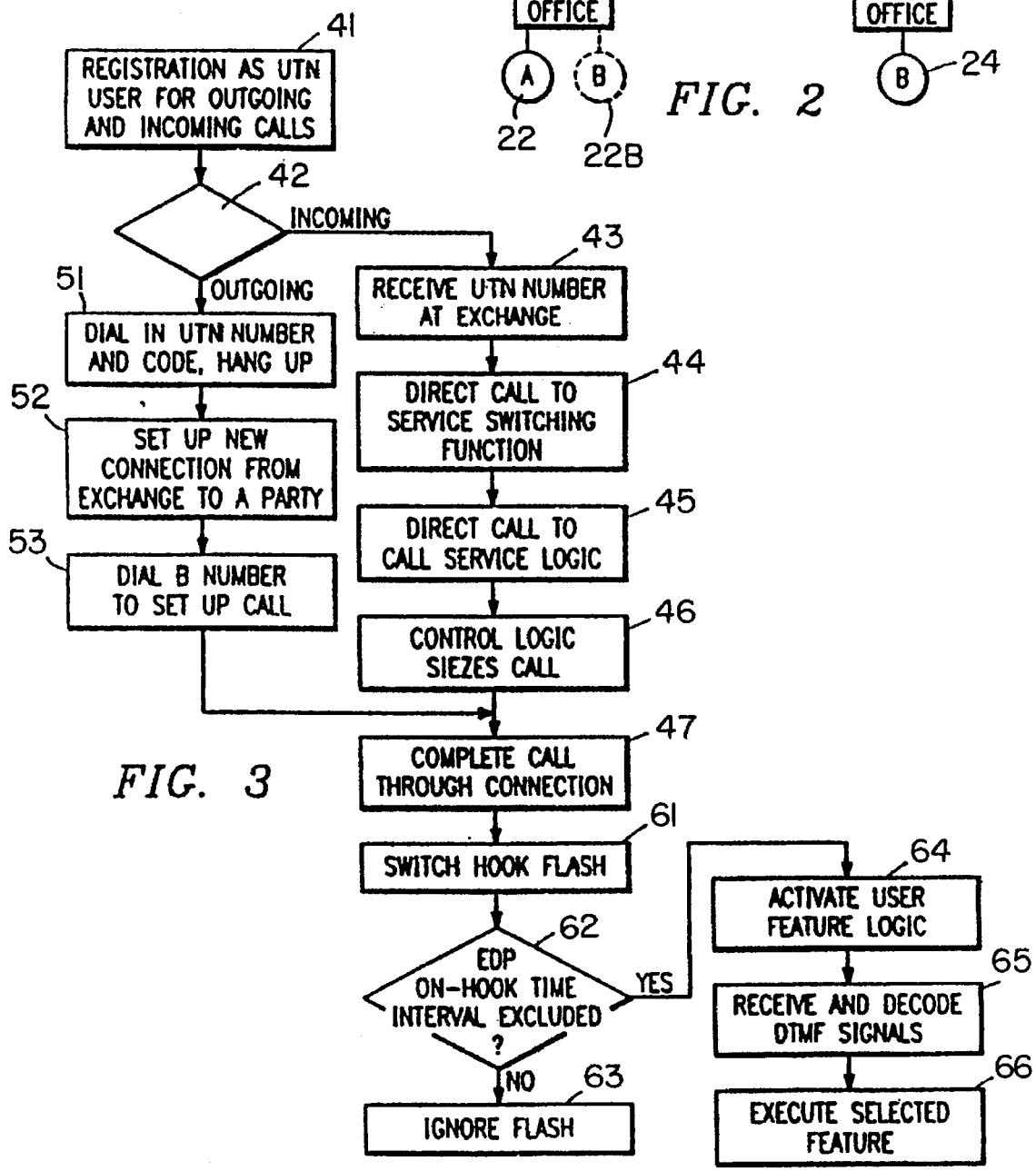
FIG. 3 is a flow chart illustrating the rendition of special subscriber telecommunication services in accordance with the teachings of the present invention.

Referring next to FIG. 3, there is from a flow chart depicting certain aspects of the methods inherent in the present invention. At step 41, a UTN subscriber registers with the system. Registration is required with the service switch function 25 within the transit exchange 20 as a UTN user for both outgoing and incoming calls. For example, a UTN user may travel to a location different from its normal location and simply select a telephone terminal at that location and dial into the network and register as being present at a given access number. The system records the UTN user's presence at that registered access number and updates its data base so that calls placed into the network for the UTN subscriber can be routed to the particular access terminal at which it is currently located. Similarly, a UTN user desiring to place a call from a terminal other than its ordinary location can dial its own UTN number into the network followed by a PIN code and thereby register with the network and update its data base so as to have access to the UTN special subscriber service features to which it has subscribed.

A UTN user can be connected to the transit exchange for access to special subscriber services as either a calling party or a called party after the UTN user has registered with the network as represented in step. Thereafter, at step 42, an incoming call to the network and intended for the registered UTN user would be recognized as such at the transit exchange or elsewhere within the network at step 43. The incoming call is directed at step 44 to the service switching function and the call service logic corresponding to the special service features to which the UTN user receiving the call subscribes is associated with the call at step 45. At step 46, the control logic in the transit exchange seizes the call for the UTN subscriber as the B-party and, at step 47, completes the connection to the B-party to set up the call with the calling A-party. Since the UTN user is connected as a B-party by virtue of the original call set up, it is capable of signalling by means of a long switch hook into the network to invoke the special service features associated at the transit exchange level.

If, however, at step 42, the UTN subscriber wants to place an outgoing call as a calling party the procedure moves to step 51, at which the UTN subscriber dials in his own UTN number, plus a PIN code and then hangs up. At step 52, the service logic recognizes the UTN subscriber and the PIN code and sets up a new connection from the service switching function to the calling UTN subscriber at the access terminal from which the call was placed. Effectively, this connects the UTN subscriber desiring to place the call into the network as a virtual "B-party." Thereafter, at step 53, the calling UTN subscriber dials the actual B-number of the called party to set up the call and the network completes the call via a through connection at step 47.

Assuming either of the illustrative UTN subscribers, both of which are viewed as "B-parties" by the network, generates a long hook flash at step 61, that flash is communicated out of the end office to the transit exchange. At step 62, the system at an event detection point (EDP) within the transit exchange determines whether the time duration of the long hook flash was within a range programmed into the services switching function so as to be recognized as a "mid-call trigger," signalling the desire of a UTN user to invoke special service features from the network. If the length of the switch hook flash was not within the pre-programmed range, the system moves to step 63 and ignores the flash. If, however, at step 62, the time interval during which the UTN subscriber's instrument was on-hook was within the pre-programmed range, e.g., 500–1500 milliseconds, the system moves to 64 at which it activates the user feature logic. Next, at step 65, the system receives, DTMF signals or other responses to a voice prompt menu to select the particular special service features desired by the UTN subscriber invoking the features by the long switch hook flash. At step 66, the system executes the selected feature for the UTN subscriber.

As can be seen from the above description, the present invention contemplates the rendition of services in a manner indicative of an intelligent network (IN). However, it should be understood that the system may be implemented without IN hardware simply by providing certain well known components in a transit exchange so as to render it responsive to a "long switch hook" flash of pre-determined duration to allow the selection of certain special service features and provide those features by service logic.

The system and method of the present invention enables the rendition of special service features to a subscriber, and particularly to UTN subscribers, in a highly efficient manner. Special subscriber features are provided within a network at considerable less cost to operators and without an expensive modification of local exchange end offices.

It is thus believed that the operation and construction of the present invention would be apparent from the foregoing description. While the method, apparatus and system shown and described has been characterized as being preferred, it will be obvious that various changes and modifications can be made therein without departing from the spirit and scope of the invention as defined in the following claims.

What is claimed is:

1. A method for providing special subscriber service features within a telephone communication network which includes a pair of local end office exchanges to which one or more subscribers is connected as a calling or called party and a transit exchange coupled between said local end office exchanges, comprising the steps of:

receiving at the transit exchange, a call from calling party authorized to receive special subscriber features, the calling party connected to a certain local end office exchange;

subsequently receiving at the transit exchange an on-hook signal from said calling party;

completing a call from said transit exchange back to said calling party through the certain local end office exchange from which the calling party originally called to connect the calling party to the telephone communication network as a "virtual called party";

placing a call from said calling party as a virtual called party to an actual called party connected to another local exchange end office, the call completed through the transit exchange;

thereafter receiving at said transit exchange a first signal from either said calling party or actual called party, said first signal comprising a switch hook flash; and recognizing within the transit exchange that said received first signal is indicative of the desire of the calling or actual called party to invoke one of a plurality of special subscriber service features.

2. The method for providing special subscriber service features within a telephone communication network as set forth in claim 1 wherein said switch hook flash is of sufficient length to be detected outside of the local end office exchange to which the calling party or actual called party is connected and at the transit exchange.

3. The method for providing special subscriber service features within a telephone communication network as set forth in claim 2, wherein the sufficient length of the switch hook flash is between 500 and 1500 milliseconds.

4. The method for providing special subscriber service features within a telephone communication network as set forth in claim 1, the step of receiving a first signal invoking certain special subscriber features further comprising the steps of:

detecting within said transit exchange the reception of a second signal from the calling or actual called party selecting a particular special subscriber service feature to invoke; and executing in the transit exchange said particular selected special subscriber service feature.

5. The method for providing special subscriber service features within a telephone communication network as set forth in claim 1, wherein said step of receiving a first signal further includes the step of receiving at the transit exchange a personal identification number (PIN).

6. A system for providing special subscriber service features within a telephone communication network which includes a pair of local end office exchanges to which one or more subscribers is connected as a calling or called party and a transit exchange coupled between said local end office exchanges, comprising;

means for receiving at the transit exchange, a call from calling subscriber authorized to receive special subscriber features, the calling subscriber connected to a certain local end office exchange means for subsequently receiving at the transit exchange an on-hook signal from said calling party;

means for completing a call from said transit exchange to said calling party through the certain local end office exchange from which the calling party originally called to connect the calling subscriber to the telephone communication network as a "virtual called party" and further enabling said calling subscriber to place a call as a virtual called party to an actual called party connected to another local exchange end office, the call completed through the transit exchange;

means for thereafter receiving at said transit exchange a first signal from either said calling party or actual called party, said first signal comprising a switch hook flash; and means for recognizing within the transit exchange that said received first signal is indicative of the desire of the calling or actual called party to invoke one of a plurality of preselected special subscriber service features.

7. The system for providing special subscriber service features within a telephone communication network as set forth in claim 6, the means for receiving a first signal invoking certain special subscriber features further comprising:

means for detecting within said transit exchange, after recognizing said first signal, the reception of a second signal from the calling party or actual called party selecting a particular special subscriber service feature to invoke; and means for executing said particular selected special subscriber service feature.

8. The system for providing special subscriber service features within a telephone communication network as set forth in claim 6 wherein said means for receiving a first signal further includes means for receiving at the transmit exchange a personal identification number (PIN).

9. The system for providing special subscriber service features within a telephone communication network as set forth in claim 6 wherein said switch hook flash is of sufficient length to be detected outside of said local end office exchange to which the calling party or actual called party is connected and at the transit exchange.

10. The system for providing special subscriber service features within a telephone communication network as set forth in claim 9 wherein the sufficient length of the switch hook flash is between 500 and 1500 milliseconds.

* * * * *

UNITED STATES PATENT AND TRADEMARK OFFICE
CERTIFICATE OF CORRECTION

PATENT NO.   :   5,633,921
DATED        :   May 27, 1997
INVENTOR(S)  :   Söderberg It is certified that error appears in the above-indentified patent and that said Letters Patent is hereby corrected as shown below:

Column 1, line 11       Replace "telecommunication"
                            With --telecommunications--

Column 3, line 2        Replace "modem"
                            With --modern--

Column 8, line 37       After "from"
                            Insert --a--

Column 9, line 26       Before "calling"
                            Insert --a--

Column 9, line 28       Replace "exchange"
                            With --exchange;--

Signed and Sealed this

Fourth Day of November, 1997

Attest:

BRUCE LEHMAN

Attesting Officer

Commissioner of Patents and Trademarks